Dec. 3, 1929.   H. G. STEINMETZ ET AL   1,737,868
STARTING MECHANISM
Filed Feb. 7, 1928

INVENTORS

Patented Dec. 3, 1929

1,737,868

UNITED STATES PATENT OFFICE

HARRY G. STEINMETZ AND HERBERT P. ECK, OF PORT CHESTER, NEW YORK

STARTING MECHANISM

Application filed February 7, 1928. Serial No. 252,476.

This invention relates to a starting mechanism and especially to a starting mechanism for an engine of the internal combustion type.

The usual type of starting mechanism comprises a starting motor having a screw threaded shaft on which shaft is mounted a weighted gear internally threaded for cooperation with the threads of the shaft. Upon starting the starting motor this gear works itself out on the shaft and engages with a gear on the fly wheel of the engine. The disadvantages of such type of apparatus are several. Due to the binding action of the screw at times, rotation of the fly wheel gear will occur when the screw threaded gear is in part engagement therewith, resulting in the stripping of both the teeth on the fly wheel as well as on the internally threaded gear. Then again, there is the disadvantage that due to the cutting of the shaft for the purpose of threading it the shaft is weakened and is subject to bending and breakage. In addition, loosening of the weight attached to the internally threaded gear for increasing its inertia, is likely to occur. Finally that apparatus involves the disadvantage of being very costly due to the extreme care which must be taken in making the internal threads on the gear correspond exactly with the threads on the shaft.

It is an object of this invention to provide a starting mechanism wherein no rotation of the driven member, that is, the fly wheel, occurs until after the gear causing its rotation is in full mesh with the gear on the fly wheel. This we do by providing a stop and cam mechanism wherein the stops produce rotation of the gear engaging with the fly wheel gear only after the cams have produced full meshing engagement of the teeth on the driving and driven gears.

Another object of this invention is to provide a simple, strong and inexpensive starting mechanism. Simplicity is attained by the use of a few parts. Over the usual type of starting mechanism described above, additional strength is obtained by not cutting into the starting motor shaft and secondly by dispensing with the use of weights for giving rotating parts added inertia.

Other objects as well as advantages of our invention will be apparent from the more full description thereof which will be given hereinafter with the aid of the accompanying drawing in which.

Figure 2:
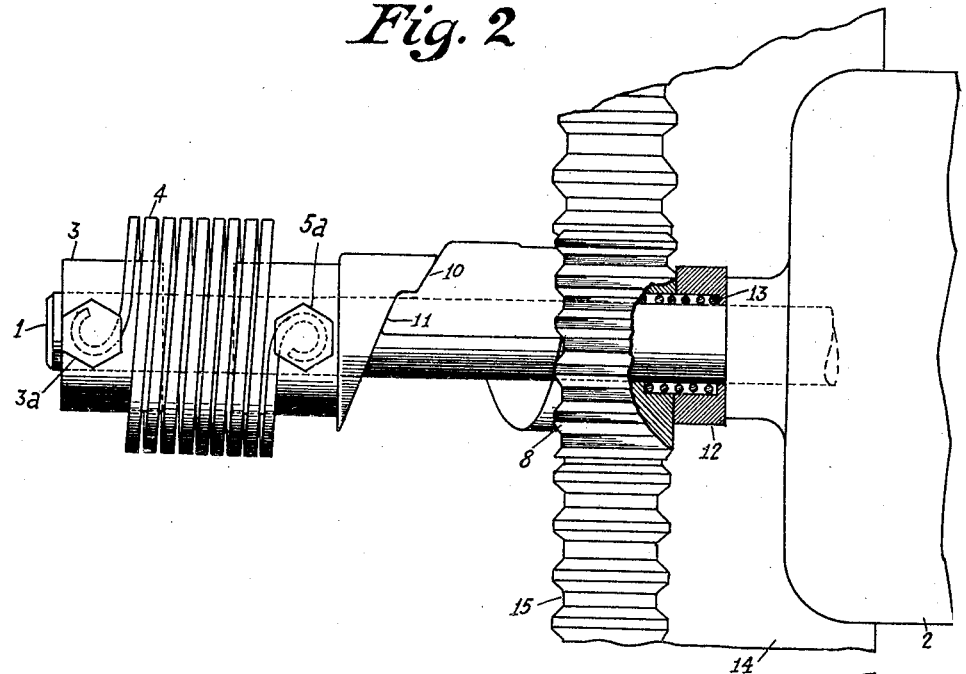
Fig. 2 shows that mechanism in engaged position for rotating the fly wheel of an engine of the internal combustion type.

Referring to the drawing, numeral 1 indicates a driving member which takes the form of the armature shaft of the starting motor 2. Fixed to shaft 1 by keys or any other suitable means is a collar 3 to which is fixed by means of a bolt 3ª yieldable means in the form of a coiled helical spring 4. Spring 4 is fastened at its other end by means of bolt 5ª to a cylindrical member 5 rotatable about and slidable along shaft 1 except as restrained by the yieldable means 4. Cylindrical member 5 is cut so as to have on one of its end faces a cam or spiral surface 6 and a stop 7.

Cooperating with the cam or spiral surface 6 and stop 7 are the stop 11 and cam or spiral surface 10 of the hub 9 of gear 8. Gear 8 is rotatable about and freely slidable along shaft 1 except as restrained by yieldable means 4 and resilient means 13. Resilient means 13 takes the form of a relatively light compression spring whose ends fit in recesses, one recess in gear 8 and one recess in abutment 12. Abutment 12 is in the form of a collar freely mounted on shaft 1 and may be keyed to it if desired. 14 indicates a driven member, in this case a fly wheel, attached to an engine (not shown) and 15 indicates the customary starting gear attached thereto. The teeth on gears 14 and 8 where they face each other may be, and are, preferably bevelled.

Figure 1:
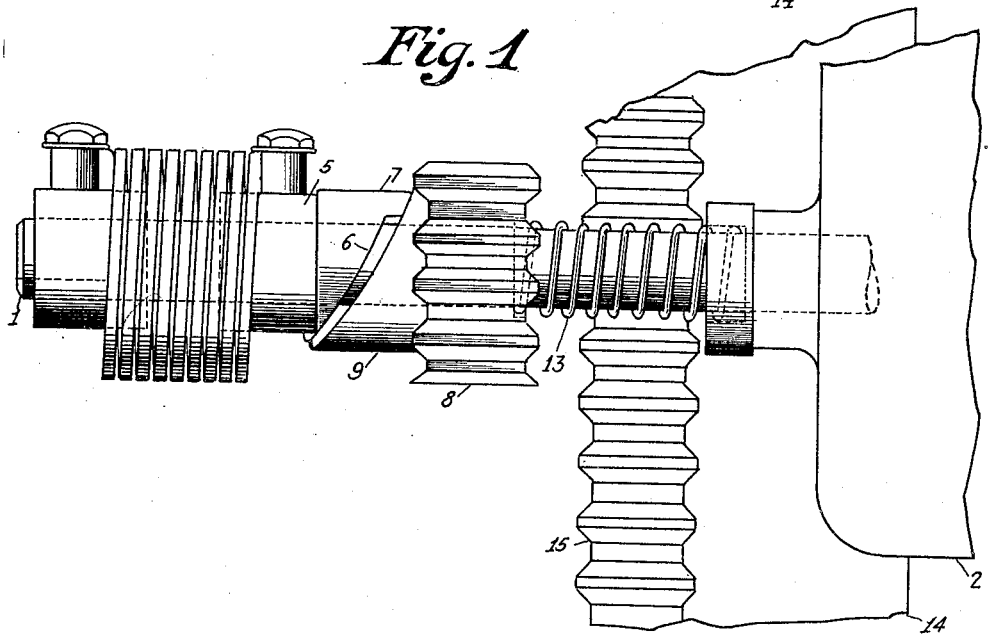
Fig. 1 shows our improved starter mechanism in disengaged position.

In operation, upon the rotation of motor 2 the driving member, that is, shaft 1, is rotated and through yieldable means 4, cylindrical member 5, having a cam surface and stop thereon, is also rotated. The forces acting on gear 8 will be such, due to the rotation of cylindrical member 5, that it will be forced axially into meshing engagement with gear 15. Rotation of gear 15 cannot occur until stops 7 and 11 contact with each other. Spring 4 takes up the shock of that contact. At that time the apparatus will be in the position shown in Fig. 2. When the stops are in contact, the engine is "turned over" by starter motor 2. As soon as the internal combustion engine starts to operate the power applied to motor 2 is shut off. Gear 15 will then drive gear 8 at a much greater speed than gear 8 could possibly be turned by motor 2 and further due to the shutting off of motor 2 gear 8 will be flipped back on shaft 1 in the position shown in Fig. 1. Spring 13 will assist in disengaging gear 8 from gear 15 and will prevent accidental meshing of 8 with gear 15 during operation of the engine.

The size of the various parts in the apparatus are so chosen and the parts are so mounted that when gear 8 abuts against abutment 12 and when spring 4 is fully compressed, the stops 7 and 11 cannot override. If desired, starter motor 2 may be placed on the other side of the starting mechanism. In such a case abutment 12 will be fixed to shaft 1 and if motor 2 is made to turn in the same direction as in its former position, the direction in which cam surfaces 6 and 10 should be cut will be the reverse of that shown. It is also apparent that stops 7 and 11 need not be placed on the end surfaces of cylindrical member 5 and hub 9 but may be made as projections extending from the cylindrical outer surfaces of member 5 and hub 9 and shaped as to abut against each other when the position of the apparatus is as shown in Fig. 2.

From this description it is clear that partial engagement of the gears resulting from the binding of the parts cannot occur for the reason that no torque will be exerted upon gear 8 until stops 7 and 11 contact. In such contacting position gear 8 must be in full meshing engagement with gear 15. It is also clear that, by the elimination of cutting into shaft 1 as is the case in the customary type of starter, the strength of shaft 1 for a given diameter is materially increased. No complicated internal threads are required and hence the cost of this apparatus is greatly reduced.

By varying the breadth of abutment 12 the amount applicants' gear 8 is moved axially may be predetermined. Or if desired the axial movement of gear 8 may be predetermined by fastening abutment 12 by means of a set screw, for example, at a desired point along shaft 1.

It is clear, of course, that our mechanism may be utilized not only for starting a gasoline engine, but also wherever apparatus of the character of this invention is required.

Having thus described our invention, what we claim is:

In apparatus of the character described, a shaft; an electric motor for driving said shaft; a driven gear; a collar fixed to said shaft; a spring fixed to said collar and encircling a portion of said shaft; a movable cylindrical member about said shaft attached to the other end of said spring, said member having cams and stops thereon on only one end face thereof, said stops protruding from the end face only and not from the cylindrical periphery of the member; an abutment; a driving gear on said shaft; a spring, under compression only, having its ends in recesses in said abutment and in an end face of said driving gear; a hub protruding from the other end face of said gear; cams and stops on the end face of said hub, cooperating with the aforementioned cams and stops, said stops on said hub also projecting from the end face only thereof and not from the cylindrical periphery of the hub, whereby when said motor rotates said shaft, the stops on the movable cylindrical member ride on the cam surfaces on the end face of the driving gear hub, and the stops on the end face of the driving gear hub ride on the cam faces on the end of said movable cylindrical member until said gears fully engage, at which time the stops cooperate to rotate said driving gear; said driving gear being flipped back to its disengaged position when said driven gear attains a predetermined speed, and being retained in that position when the electric motor ceases to rotate said shaft by said spring under compression.

HARRY G. STEINMETZ.
HERBERT P. ECK.